Nov. 18, 1924.　　　　　　　　　　　　　　　1,515,956
G. R. LE MAIRE
BRAKE BAND CONSTRUCTION
Filed Dec. 20, 1923
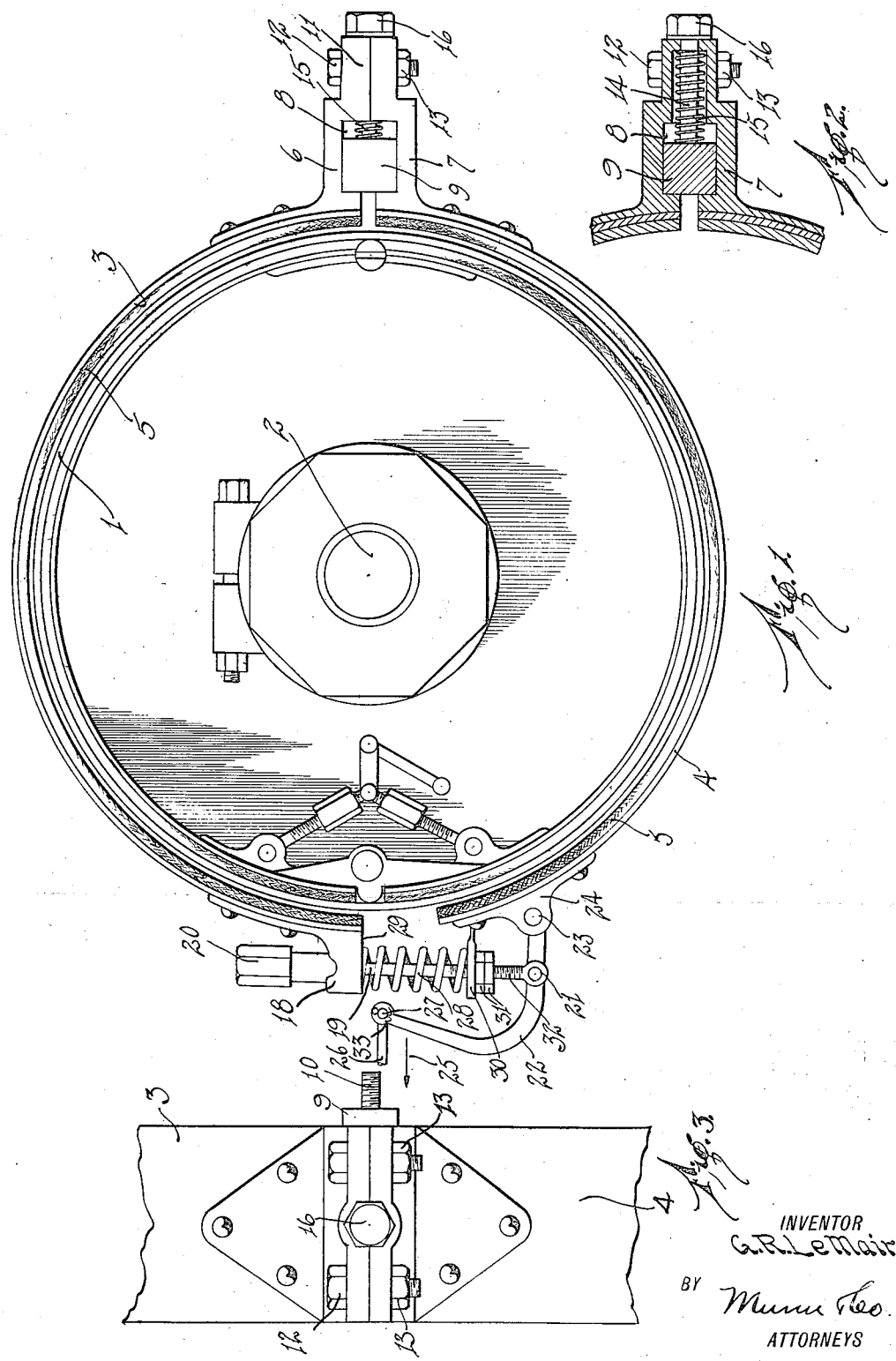
INVENTOR
G.R.LeMaire
BY
Munn Co.
ATTORNEYS Patented Nov. 18, 1924.

1,515,956

UNITED STATES PATENT OFFICE.

GEORGE ROBERT LE MAIRE, OF CENTRAL CITY, KENTUCKY.

BRAKE-BAND CONSTRUCTION.

Application filed December 20, 1923. Serial No. 681,832.

*To all whom it may concern:*

Be it known that I, GEORGE R. LE MAIRE, a citizen of the United States, and a resident of Central City, in the county of Muhlenberg and State of Kentucky, have invented a new and useful Improvement in Brake Band Constructions, of which the following is a full, clear, and exact description.

My invention relates to improvements in brake band constructions, and more particularly to that type of brake band construction known as external brake construction, and it consists in the combinations, constructions, and arrangements herein described and claimed.

An object of my invention is to provide a brake band of the type described which may be removed from a brake drum without the necessity of first removing the wheel of the motor vehicle. In the ordinary type of brake construction, the brake band is constructed in a single piece, and it is essential that the wheel be removed in order to move the band laterally from the drum.

A further object of my invention is to provide a brake band of the type described in which the work required for removing the brake band, as for the purpose of relining is greatly facilitated, and in which the time required is reduced to a minimum. I have found that with my improved construction, the brake band may be removed for relining in approximately one-fifth the time required for the removal of the ordinary brake band.

A further object of my invention is to provide a brake band of the type described in which novel means is provided for clamping the two cooperating portions of the band to one another and to a common support.

A further object of my invention is to provide a brake band of the type described in which means is provided for preventing the binding of the brake band at the rearward portion thereof, i. e., that portion remote from the brake rod.

A further object of my invention is to provide a device of the type described which is simple in construction, durable, and which is thoroughly practical for the purpose intended.

Other objects and advantages will appear in the following specification, and the novel features of my invention will be particularly pointed out in the appended claims.

My invention is illustrated in the accompanying drawings, forming part of this application, in which—

Figure 1 is a side elevtaion of an embodiment of my invention,

Figure 2 is a sectional view of a portion of the mechanism illustrated in Figure 1, and Figure 3 is a rear elevation of the mechanism illustrated in Figure 1.

In carrying out my invention I make use of the ordinary type of brake drum 1. This drum 1 is secured to the motor vehicle wheel (not shown) which is supported or keyed to an axle shaft 2. The drum 1 is exactly concentric with the shaft 2.

My improved brake band construction pertains primarily to external brake bands, and consists in a pair of segmental brake bands 3 and 4 substantially semi-circular in contour, and each having a brake lining 5 thereupon.

The segmental bands 3 and 4 are each provided with one of a pair of cooperating clamping and supporting members 6 and 7 respectively, these members 6 and 7 having angular recesses 8 in adjacent walls thereof, which cooperate to form an angular opening through which an angular block or anchor pin 9 is projected. This pin 9, (see Figure 3) has a threaded portion 10 by means of which the pin may be mounted upon the chassis of the vehicle or the axle housing, as the case may be.

Referring to Figure 3, it will be noted that the contacting portions 11 of the cooperating members 6 and 7 are securely bolted to one another by means of bolts 12 projected therethrough. The bolts 12 are provided with nuts 13 by means of which the portions 11 may be tightly clamped to one another.

Referring now to Figure 2 it will be noted that the opening provided by the adjacent recesses 8 in the members 6 and 7 is greater in length than the thickness of the anchor pin 9, so that therefore the members 6 and 7 are free to move longitudinally relative to the stationary pin 9. A bolt 14 having a threaded portion 15 at the innermost end thereof is secured to the anchor pin 9 by means of engagement of the threaded portion 15 with the threaded bore of the adjacent side of the pin 9. The opposite end of the bolt 14 is projected through the registering recesses in the end walls 11 of the members 6 and 7, and a head portion 16 of the bolt 14 is disposed at the outermost end of the bolt, so that rotation of the head portion 16 may occasion movement of the clamping members 6 and 7 toward the anchor pin 9.

The compression spring 17 is mounted concentric with the bolt 14 and is arranged to pull against the pin 9 at one end and against the adjacent inner wall of the end portions 11 of the clamping members 6 and 7, (see Figure 2). The purpose of this spring 17 is to at all times force the members 6 and 7 rearwardly of the pin 9 so as to assure clearance between the linings 5 of the segmental bands 3 and 4 with respect to the drum 1.

The opposite end of the band 3 is provided with a lug 18 having an opening therethrough; for the projection of a rod 19. The upper end of the rod 19 is threaded, and an adjusting nut 20 is disposed thereupon so that adjustment of the nut 20 will occasion the longitudinal movement of the rod 19 with respect to the lug 18.

The lower end of the rod 19 is pivotally attached at 21 to an arcuate arm 22 which is pivotally mounted at 23 upon a lug 24 fixed to the band 4. Obviously, movement of the arm 22 in the direction of the arrow 25 as by means of a brake rod 26 pivotally attached to the arm at 27 will occasion the movement of the adjacent ends of the bands 3 and 4 toward one another, and therefore the close engagement of the brake linings 5 with the drum 1.

A means for normally maintaining the segmental bands 3 and 4 out of engagement with the drum 1 so that the drum may rotate freely within the lining 5 is provided in a compression spring 28 mounted concentric with the rod 19 and having one end bearing upon the adjacent surface of the lug 18 as shown at 29, the opposite end bearing upon an eyelet 30 supported on the brake housing (not shown). A pair of nuts 31 is disposed upon a threaded portion 32 of the rod 19 adjacent the lowermost end of the rod, whereby movement of the lugs 18 and 24 apart from one another may be accurately limited so that the brake lining 5 may just clear the brake drum.

From the foregoing description of the various parts of the device, the operation thereof may be readily understood. My invention is primarily intended to facilitate the work involved in removing the brake bands of a motor vehicle so that these bands may be relined or repaired as is often necessary by the ordinary use of the brake.

In removing my improved brake band, it is merely necessary to remove the brake rod 26 from the arm 22. This may be done by extracting a cotter pin such as shown at 33, or by disconnecting the rod 26 from the arm 22 in the manner made necessary by the particular construction between the rod and the arm. If the rod 26 has been disconnected from the arm the adjusting nut 20 is removed from the rod 19, whereupon removal of the bolts 12 by unfastening the nuts 13 at the rear portion of the brake band will permit the bands 3 and 4 to be moved apart from one another, away from the drum 1 and entirely out of engagement with the vehicle so that the lining 5 may be replaced or repairs made which might be deemed necessary.

If it is necessary to adjust the rearward portion of the brake band so that it will not bind upon the drum 1, the head 16 of the bolt 14 is turned so as to permit the spring 15 to force the cooperating members 6 and 7 away from the drum and therefore draw the bands 3 and 4 with their linings 5 away from the drum.

Limitation of the movement of the lugs 18 and 24 toward and away from one another may be brought about by adjustment of the nut 20.

I claim:

1. A brake band comprising an anchor block, a pair of cooperating clamping and supporting members secured to one another and movably attached to said anchor block, a pair of segmental brake bands substantially semi-circular in contour, one attached to each of the cooperating clamping and supporting members, and means for drawing the opposite ends of said segmental band toward one another at will.

2. A brake band construction comprising an anchor block, a pair of cooperating clamping and supporting members secured to one another and movably attached to said anchor block, means for yieldably maintaining said clamping and supporting members in a predetermined position relative to said anchor block, a pair of segmental brake bands substantially semi-circular in contour, one attached to each of the cooperating clamping and supporting members, and means for drawing the opposite ends of said segmental band toward one another at will.

3. A brake band construction of the type described comprising an anchor block, a pair of cooperating clamping and supporting members having registering recesses therein, means for removably attaching said clamping and supporting members to one another so that the registering recesses form an opening for the introduction of said anchor block, a spring for maintaining said clamping and supporting members in a predetermined position relative to said anchor block, means for limiting the movement of said clamping and members relative to said block, and a pair of segmental brake bands attached to each of said clamping and supporting members.

GEORGE ROBERT LE MAIRE.